(12) United States Patent  
Moose et al.

(10) Patent No.: US 9,444,106 B2  
(45) Date of Patent: Sep. 13, 2016

(54) SIMULTANEOUS COATING OF FUEL CELL COMPONENTS

(71) Applicant: GM Global Technology Operations LLC, Detroit, MI (US)

(72) Inventors: Scott C. Moose, Victor, NY (US); Bradley M. Houghtaling, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 276 days.

(21) Appl. No.: 13/833,005

(22) Filed: Mar. 15, 2013

(65) Prior Publication Data

US 2014/0261982 A1 Sep. 18, 2014

(51) Int. Cl.
*H01M 8/00* (2016.01)
*H01M 4/88* (2006.01)
*H01M 8/10* (2016.01)

(52) U.S. Cl.
CPC ......... *H01M 4/8825* (2013.01); *H01M 4/8828* (2013.01); *H01M 8/1004* (2013.01); *Y02E 60/522* (2013.01)

(58) Field of Classification Search
None
See application file for complete search history.

(56) References Cited

U.S. PATENT DOCUMENTS

| 6,855,178 | B2 | 2/2005 | Uchida et al. | |
| 2002/0197535 | A1* | 12/2002 | Dudley et al. | 429/246 |
| 2012/0009503 | A1* | 1/2012 | Haug et al. | 429/523 |
| 2012/0129077 | A1* | 5/2012 | Hirakimoto et al. | 429/494 |

FOREIGN PATENT DOCUMENTS

| CN | 1308993 A | 8/2001 |
| JP | 2008130416 | 6/2008 |
| WO | 95/29763 | 11/1995 |

* cited by examiner

*Primary Examiner* — Cynthia H Kelly
*Assistant Examiner* — Monique Wills
(74) *Attorney, Agent, or Firm* — Quinn Law Group, PLLC

(57) ABSTRACT

Disclosed are methods for simultaneous application of multiple fuel cell component coatings onto a substrate. The method comprises providing a substrate, and simultaneously coating two or more solutions onto the substrate under laminar flow.

20 Claims, 12 Drawing Sheets

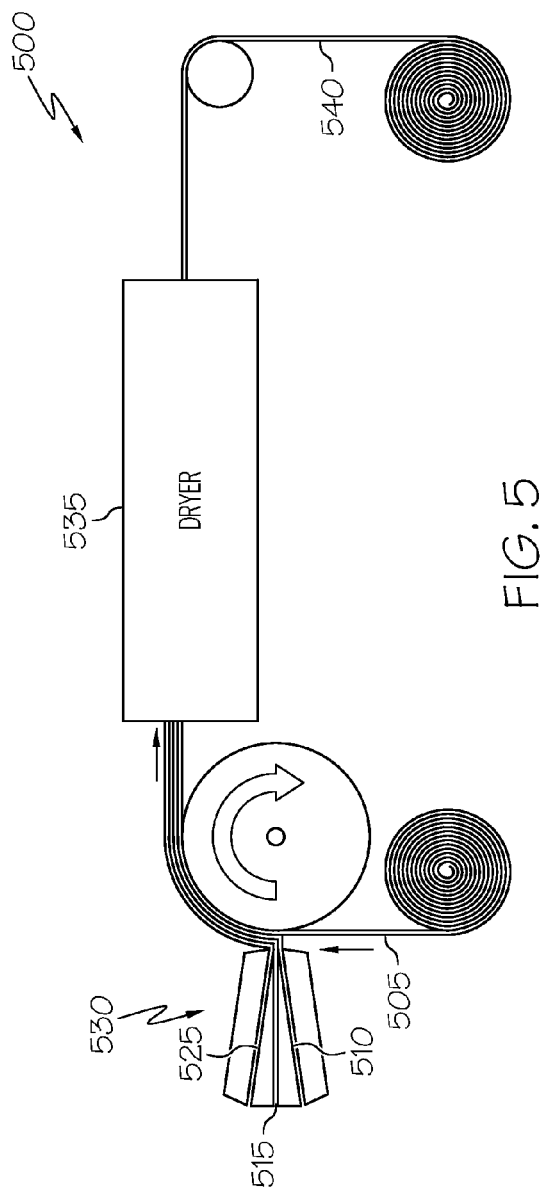
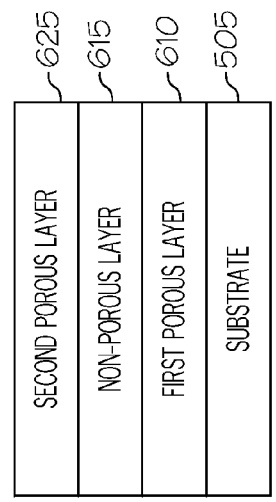
FIG. 5
FIG. 6

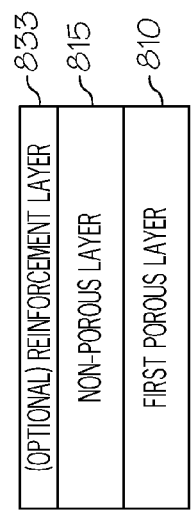
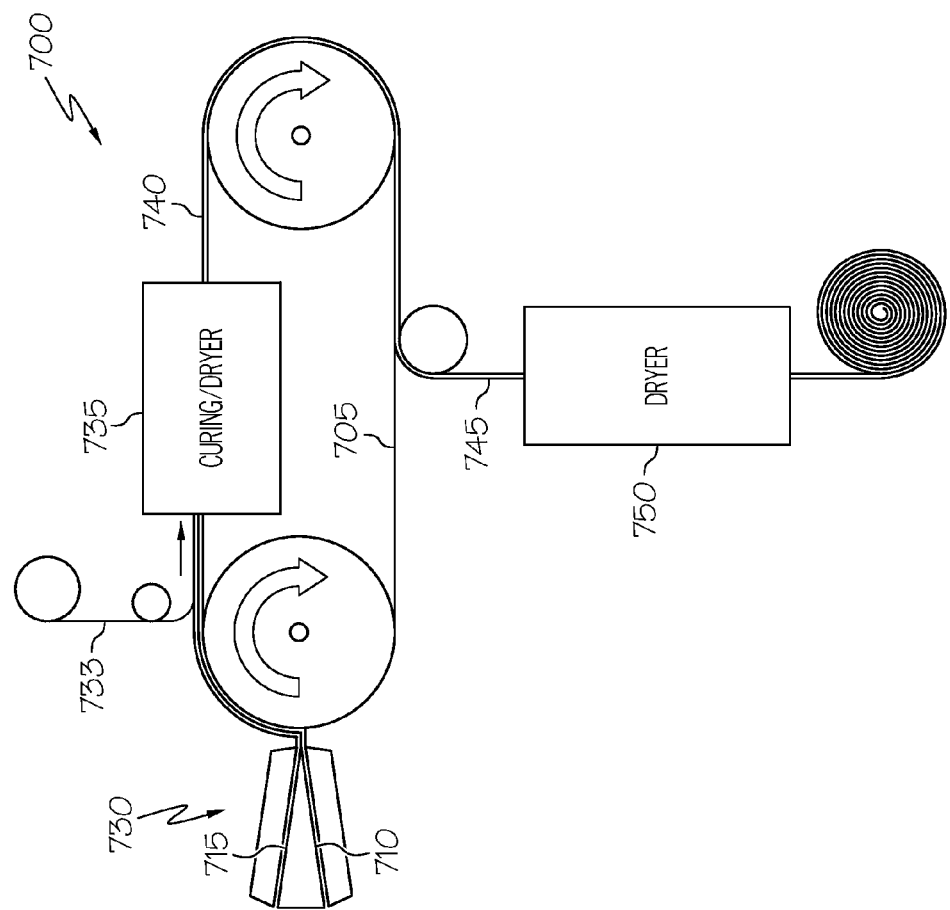
FIG. 8
FIG. 7

SIMULTANEOUS COATING OF FUEL CELL COMPONENTS

TECHNICAL FIELD

The embodiments described herein generally relate to a process for coating a fuel cell component, and more particularly, it relates to a process for the simultaneous application of multiple fuel cell component coatings on a substrate.

BACKGROUND

Electrochemical conversion cells, commonly referred to as fuel cells, produce electrical energy by processing reactants, for example, through the oxidation and reduction of hydrogen and oxygen. In some fuel cell systems, hydrogen or a hydrogen-rich gas is supplied as a reactant through a flowpath to the anode side of a fuel cell, while oxygen (such as in the form of atmospheric oxygen) is supplied as a reactant through a separate flowpath to the cathode side of the fuel cell. The anode and cathode facilitate the electrochemical conversion of the reactants into electrons and positively charged ions (for the hydrogen) and negatively charged ions (for the oxygen). An electrolyte layer separates the anode from the cathode to allow for selective passage of ions from the anode to the cathode, while simultaneously prohibiting the passage of the generated electrons. The generated electrons are instead forced to flow through an external electrically conductive circuit (such as, a load) to perform useful work before recombining with the charged ions at the cathode. The combination of the positively and negatively charged ions at the cathode results in the production of non-polluting water as a byproduct of the reaction.

A polymer electrolyte fuel cell may comprise a polymer membrane (e.g., a proton exchange membrane (PEM)) with catalyst electrode layers on both sides. The catalyst coated PEM may be positioned between a pair of gas diffusion media (GDM), and placed outside of the gas diffusion media layers are cathode and anode plates. During manufacturing of a membrane electrode assembly, catalyst electrode layers can be coated successively on each side of a membrane support. That is, the layers are formed using sequential coating operations, including partial or complete drying of one layer before the next layer is applied to the membrane support.

Alternatively, catalyst coated diffusion media layers can be used in which the catalyst is coated on gas diffusion media. During manufacturing of catalyst-coated diffusion media, a catalyst electrode layer and an ionomer layer can be coated successively on one side of a substrate. Similar to the manufacturing of a polymer electrolyte fuel cell, the layers are formed using sequential coating operations, including partial or complete drying of each layer before the next layer is applied to the membrane support.

The manufacturing processes are complex, time-consuming, and costly. Where numerous layers are involved, there may be considerable duplication of coating and drying equipment. In some instances, where layers are coated without drying steps between each coating layer, intermixing of the layers and/or the critical ingredients dispersed or dissolved therein can occur. In addition, non-uniform layers having variable layer thicknesses can result.

Therefore, alternative fuel cells, membrane electrode assemblies, and methods for fabricating membrane electrode assemblies are disclosed herein.

SUMMARY

In embodiments disclosed herein are methods for simultaneous application of multiple fuel cell component coatings on a substrate. The methods comprise providing a substrate, and simultaneously coating two or more solutions onto the substrate under laminar flow such that a non-porous layer solution is simultaneously coated on a first porous layer solution, wherein the first porous layer solution comprises an electrode ink and the non-porous layer solution comprises a membrane solution.

In embodiments also disclosed herein are methods for simultaneous application of multiple fuel cell component coatings on a substrate. The methods comprise providing a substrate, and simultaneously coating three or more solutions onto the substrate under laminar flow such that a non-porous layer solution is simultaneously coated on a first porous layer solution, wherein the first porous layer solution comprises an electrode ink and the non-porous layer solution comprises a membrane solution.

In embodiments also disclosed herein are methods of making a membrane electrode assembly. The methods comprise simultaneously coating two or more solutions onto a first substrate to form a cathode substrate, wherein the coating is performed under laminar flow such that a membrane solution is simultaneously coated on a cathode solution, simultaneously coating two or more solutions onto a second substrate to form a anode substrate, wherein the coating is performed under laminar flow such that a membrane solution is simultaneously coated on a anode solution, and hot pressing the cathode substrate to the anode substrate such that the cathode and anode are on opposite sides of the membrane.

Additional features and advantages of the embodiments for fuel cells, membrane electrode assemblies, and methods for fabricating membrane electrode assemblies described herein will be set forth in the detailed description which follows, and in part will be readily apparent to those skilled in the art from that description or recognized by practicing the embodiments described herein, including the detailed description which follows, the claims, and the appended drawings.

Both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 5 depicts an exemplary 3-layer simultaneous coating method of a fuel cell component according to one or more embodiments shown and/or described herein.

FIG. 6 depicts a cross-sectional view of another exemplary 3-layer fuel cell component formed according to the process of FIG. 5.

FIG. 7 depicts an exemplary 2-layer simultaneous coating method of a fuel cell component according to one or more embodiments shown and/or described herein.

FIG. 8 depicts a cross-sectional view of an exemplary 2-layer fuel cell component formed according to the process of FIG. 7.

DETAILED DESCRIPTION

Figure 1:
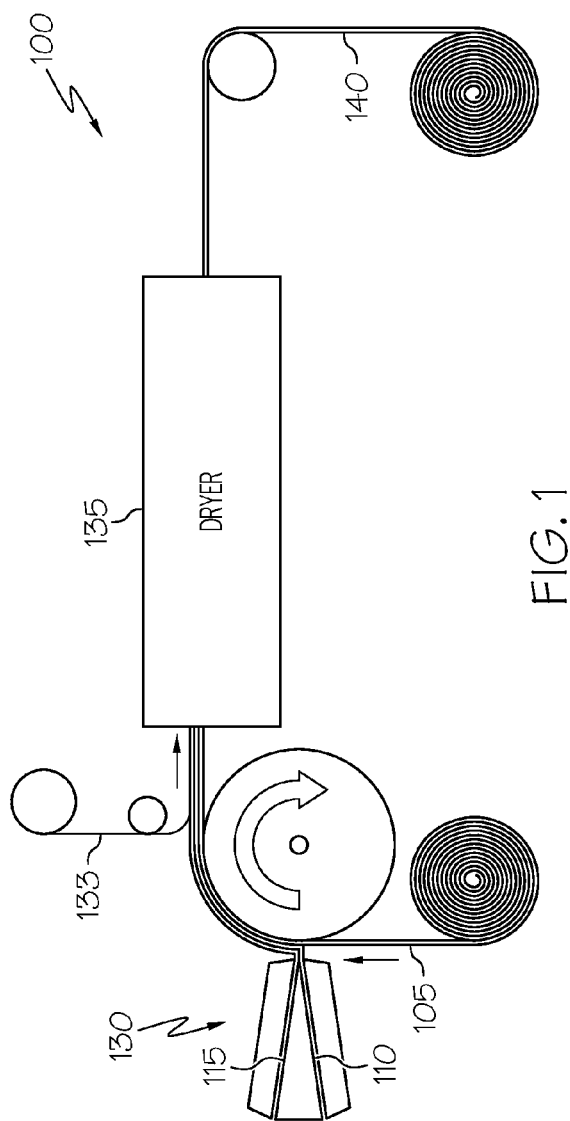
FIG. 1 depicts an exemplary 2-layer simultaneous coating method of a fuel cell component according to one or more embodiments shown and/or described herein.

Reference will now be made in detail to embodiments of methods for simultaneously coating fuel cell components to form membrane electrode assemblies and subassemblies, examples of which are illustrated in the accompanying drawings. Whenever possible, the same reference numerals will be used throughout the drawings to refer to the same or like parts.

For the purposes of describing and defining the present invention, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Disclosed herein are methods for simultaneous application of multiple fuel cell component coatings onto a substrate. The methods may be used to provide processing improvements in one or more of cost, performance, durability, and manufacturing efficiency. It has been found that simultaneous coating of two or more components can improve manufacturing efficiency and reduce manufacturing costs by reducing the number of passes through the coating machine. In addition, component costs may also be reduced. Using component solutions, for e.g., membrane ionomer solutions, are generally less expensive than purchasing the component parts, for example, a freestanding membrane. Yield improvements may also be realized since fewer passes through a coating machine may reduce the likelihood of additive process defects, and reduced start-up/shutdown waste. There may also be improvements in durability and/or performance when the layers are applied directly to the coating substrate simultaneously resulting in a more intimate and tightly bound interface between the layers. Finally, there may be a cost advantage to coating the functional layers simultaneously, which can result in a reduced amount of raw materials required to meet performance requirements.

As will be described in greater detail below, the methods generally comprise providing a substrate, and simultaneously coating two or more solutions onto the substrate. As used herein, "solution" means true solutions, dispersions and/or emulsions.

There are many possible combinations of solutions that can be simultaneously deposited on a substrate. Some examples, include, but are not limited to: a membrane (non-porous layer) solution simultaneously coated on an electrode ink (or first porous layer solution); an electrode ink (or first porous layer solution) simultaneously coated on a microporous layer solution and a membrane solution simultaneously coated on the electrode ink; and a membrane (non-porous layer) solution simultaneously coated on an electrode ink (or first porous layer solution) and a second electrode ink (second porous layer solution) simultaneously coated on the membrane solution. Of course, other combinations of simultaneously depositing solutions will be apparent to those of ordinary skill in the art in view of the teachings, and can include, for example, several layers of electrodes, membranes or microporous layers using the simultaneous coating processes described herein.

Referring to FIG. 1, an exemplary method (100) of simultaneously applying two coatings under laminar flow to a substrate is depicted. On the surface of a substrate (105), a non-porous layer solution (115) is simultaneously applied with a first porous layer solution (110) using a coating die (130). The coating solutions are applied such that the non-porous layer solution is simultaneously coated on the first porous layer solution. After application of the coating solutions, the substrate is shown passing through a dryer (135) or a series of dryers to dry the coating solutions by solvent removal, thereby forming a coated substrate (140). Prior to the substrate passing through a dryer, a porous reinforcement layer (133) may optionally be applied to the non-porous layer solution to provide additional support to the resulting structure. Examples of suitable porous reinforcement layers may include, but are not limited to, a polymer film, a metal screen, a woven fabric, or combinations thereof. Examples of suitable polymer films may include polytetrafluoroethylene (PTFE), expanded polytetrafluoroethylene (ePTFE), polyvinylidene fluoride (PVDF), or fluoroethylene propylene (FEP).

Figure 2:
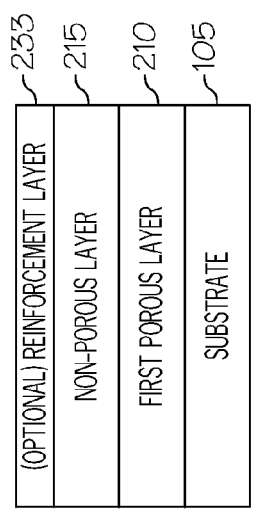
FIG. 2 depicts a cross-sectional view of an exemplary 2-layer fuel cell component formed according to the process of FIG. 1.

As further shown in FIG. 2, the coated substrate formed by the exemplary method of FIG. 1 comprises a substrate (105), a first porous layer (210) formed on the substrate, and a non-porous layer (215) formed on the first porous layer (210). As noted above, an optional reinforcement layer (233) may be applied to the non-porous layer (215).

In some examples, a membrane solution is simultaneously applied with a cathode solution. In other examples, a membrane solution is simultaneously applied with an anode solution. In forming a membrane electrode assembly (MEA), the cathode portion and the anode portion may be dried and then hot pressed/laminated together to form the MEA. The pressure and time for the hot press/lamination may vary for different types of MEAs. Additional layers (e.g., ePTFE, subgasket, etc.) may be positioned between the anode or cathode portion before being hot pressed/laminated.

Figure 3:
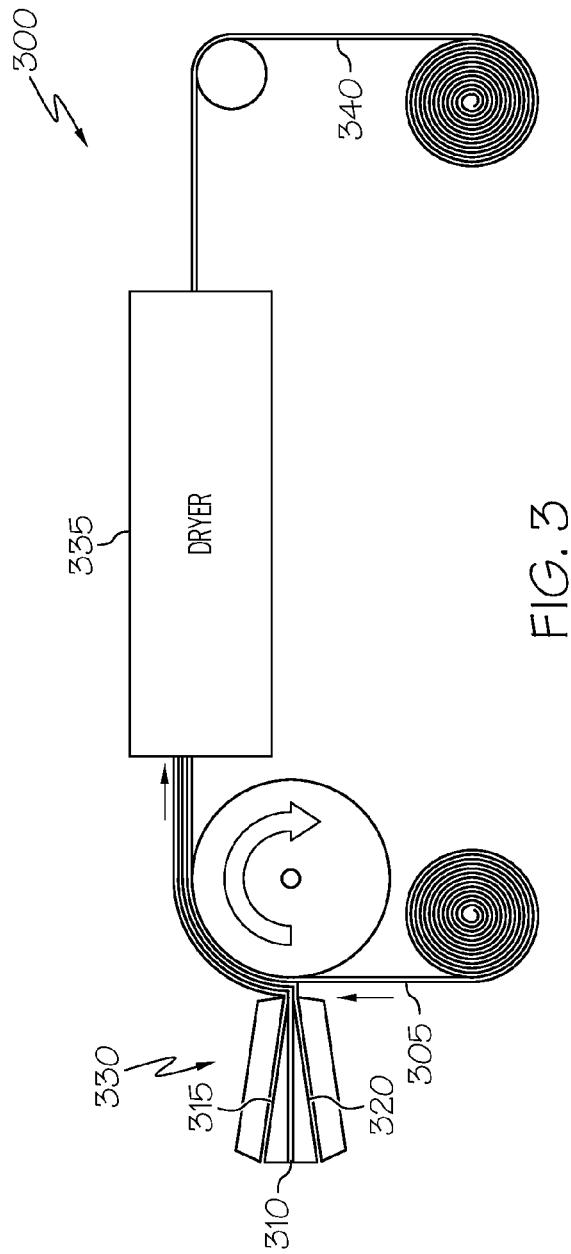
FIG. 3 depicts an exemplary 3-layer simultaneous coating method of a fuel cell component according to one or more embodiments shown and/or described herein
Figure 4:
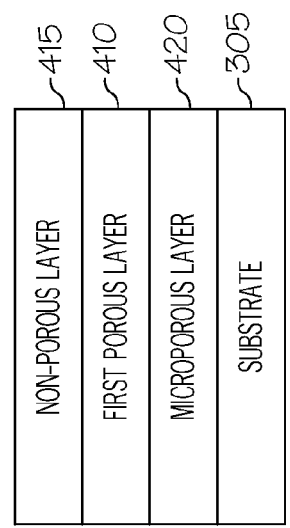
FIG. 4 depicts a cross-sectional view of another exemplary 3-layer fuel cell component formed according to the process of FIG. 3.

Referring to FIG. 3, another exemplary method (300) is depicted. In this example, the method (300) is shown simultaneously applying three coatings to a substrate under laminar flow. On the surface of a substrate (305), a microporous layer solution (320), a first porous layer solution (310) and a non-porous layer solution (315) are simultaneously applied using a coating die (330). The coating solutions are applied such that the first porous layer solution is simultaneously coated on a microporous layer solution and the non-porous layer solution is simultaneously coated on the first porous layer solution. After application of the coating solutions, the substrate is shown passing through a dryer (335) or a series of dryers to dry the coating solutions by solvent removal, thereby forming a coated substrate (340). Though not depicted, an optional reinforcement layer may be added to provide additional support to the structure prior to the substrate passing through the dryer. As further shown in FIG. 4, the coated substrate comprises a substrate (305), a microporous layer (420) formed thereon, a first porous layer (410) formed on the microporous layer (420) and a non-porous layer (415) formed on the first porous layer (410).

In some examples, a cathode solution, a microporous solution, and a membrane solution are simultaneously applied onto a substrate. In other examples, an anode solution, a microporous solution, and a membrane solution are simultaneously applied onto a substrate. In forming a membrane electrode assembly (MEA), the cathode portion and the anode portion may be dried and then hot pressed/laminated together to form the MEA.

Referring to FIG. 5, another exemplary method (500) is depicted. In this example, the method (500) is shown simultaneously applying three coatings to a substrate under laminar flow. On the surface of a substrate (505), a first porous layer solution (510), a non-porous layer solution (515) and a second porous layer solution (525) are simultaneously applied using a coating die (530). The coating solutions are applied such that the non-porous layer solution is simultaneously coated on the first porous layer solution, and a second porous layer solution is simultaneously coated on the non-porous layer solution. After application of the coating solutions, the substrate is shown passing through a dryer (535) or a series of dryers to dry the coating solutions by solvent removal, thereby forming a coated substrate (540). As further shown in FIG. 6, the coated substrate comprises a substrate (505), a first porous layer (610) formed thereon, a non-porous layer (615) formed on the first porous layer (610) and a second porous layer (625) formed on the non-porous layer (615).

In some embodiments, a cathode solution, a membrane solution, and an anode solution are simultaneously coated onto a substrate. For example, three coatings may be simultaneously applied such that the cathode (or anode) solution is on the substrate, the membrane solution is on the cathode (or anode) solution, and the anode solution (or cathode) is on the membrane solution. To form the MEA, a second substrate (e.g., gas diffusion media) may be affixed to the top layer of the three-layer structure, and opposite to the first substrate. In this example, a second substrate may be affixed to the anode (or cathode) layer to form the MEA.

Referring to FIG. 7, another exemplary method (700) is depicted. In this example, the method (700) is shown simultaneously applying two coatings to a decal substrate under laminar flow. The decal substrate is a chemically stable, flat, smooth nonporous substrate to which coatings may be applied, but such coatings are subsequently removed from the decal substrate at a later step in the process. A decal substrate is not used in forming a membrane electrode assembly. On the surface of the decal substrate (705), a first porous layer solution (710) and a non-porous layer solution (715) are simultaneously applied using a coating die (730). The coating solutions are applied such that the non-porous layer solution (715) is simultaneously coated on the first porous layer solution (710). An optional reinforcement layer (733) may be added to provide additional support to the structure prior to the substrate passing through the dryer. After application of the coating solutions, the coated layers (710, 715) are shown passing through a curing/drying (735) zone to remove a portion or all of the solvent contained in the layers to form a coated substrate (740). The laminate (745), which is the coated layers (710, 715, & optionally 733) are then separated from the substrate (705). In some examples, the laminate (745) may be separated from the substrate (705) by peeling. Optionally, the laminate (745) may then be passed through a dryer (750) or a series of dryers to dry the laminate by full solvent removal. As further shown in FIG. 8, the laminate (745) comprises a first porous layer (810), a non-porous layer (815) formed on the first porous layer (810) and an optional reinforcement layer (833) formed on the non-porous layer (815). Other process steps will be apparent to those of ordinary skill in the art in view of the teachings herein. By way of example only, the processes depicted may simultaneously coat two, three, four, five, etc. or more layers on a substrate or decal substrate with different combinations of porous and non-porous layers.

In some examples, a membrane solution and a cathode solution are simultaneously coated onto the decal substrate, and then dried to form the cathode portion. In other examples, a membrane solution and an anode solution are simultaneously coated onto the decal substrate, and then dried to form the anode portion. In forming a membrane electrode assembly (MEA), the cathode portion and the anode portion may be hot pressed together to form the MEA. After hot pressing, the decal can be peeled from the electrode, and gas diffusion media can be placed on both the anode and cathode to form a composite assembly. Optionally, a subgasket may be applied as needed.

In some examples, the first porous layer and an adhesive ionomer layer (not shown) may be simultaneously deposited on the substrate or the microporous layer, prior to formation of the non-porous layer on the first porous layer. Because both the first porous layer and the non-porous layer include the ionomer, the adhesive ionomer layer may provide better contact and/or adhesion between the first porous layer and the non-porous layer. Without being bound by theory, it is believed that the adhesive ionomer layer can decrease the contact resistance between the first porous layer and the non-porous layer, and increase the proton exchange between the first porous layer and the non-porous layer. All of which can increase fuel cell performance. In one example, the ionomer layer is a mixture of an ionomer and methanol; however, other ionomer solutions may be equally suitable. The ionomer layer can provide good ionomer contact between the first and second porous layers and the non-porous layer.

The simultaneous coating methods disclosed herein can be used to form a membrane electrode assembly (MEA) as described above. The MEA formed according to one or more embodiments described herein may be sandwiched between two bipolar plates (BPPs) to form a fuel cell. The term bipolar plate, as used in the art, encompasses monopole plates as well. The plates may be electrically conductive, and, in some examples, may be made of a carbon composite, metal, or plated metal material. In some embodiments, fuel cell stack comprises a number of MEA's stacked alternately with bipolar plates. In some embodiments, the fuel cell stack may have a stack durability of at least about 1,000 hours, at least about 1,500 hours, or at least about 2,000 hours. In other embodiments, the fuel cell stack may have a stack durability of less than about 7,000 hours, 6,000 hours, or 5,000 hours.

The coating solutions may be simultaneously applied using a slot die coating process, slide coating process, curtain coating process, or combinations thereof. In a slot die coating process, a coating die may be used that has two or more slots to permit passage of different coating solutions through each slot. In a slide coating process, simultaneous application of two or more coating solutions occurs using a slide coating die. A slide coating die forms a two or more liquid layer composite (i.e., one layer on top of another) that flows down a coating die slide surface, over a coating die lip surface, and onto the substrate. In a curtain coating process, liquid flows out of a slit and falls under gravity (called a curtain) onto a horizontally moving substrate. Similar to the slide coating process, a curtain may be a two or more liquid layer composite. The dryer or series of dryers may include infrared dryers, infrared lamps, hot-air dryers, or other dryers suitable for drying multiple coating solution layers.

It has been surprisingly found that in using the processes disclosed herein, two or more solutions may be simultaneously applied to a substrate while still maintaining a distinct layer relationship between the coatings after deposition and drying. In addition, it has been surprisingly found that in simultaneously coating two or more solutions comprising solvents and small solid particles onto a substrate, two or more coating solution layers may be simultaneously applied with no noticeable mixing or contamination at the interface of the layers. For example, where a non-porous layer is simultaneously coated on top of a porous layer, it has been surprisingly found that the porous (lower) layer is not mixed or contaminated by the nonporous (upper) layer. Without wishing to be bound by theory, it is believed that to obtain a distinct layer relationship in a simultaneous coating process, the coating solutions should be joined under laminar flow conditions.

For simultaneous deposition of multiple layers using the coating techniques outlined previously, the flow regime for each layer is laminar in order to avoid layer mixing. Mixing of the membrane and electrode layers can lead to direct shorting of the cell since each electrode would be in intimate contact with the other in an MEA. The Reynolds number in the slot of a die is used to assess the degree of laminar flow. In some examples, the Reynolds number is less than about 2100 to maintain distinct layers. In other examples, the Reynolds number is less than about 50 to maintain distinct layers. In further examples, the Reynolds number is less than about 10 to maintain distinct layers. The Reynolds number is dimensionless, and may be calculated as follows:

$$Re = \rho * v * h / \mu$$

where $\rho$ = fluid density, $\frac{g}{cm^3}$;

$v$ = fluid velocity, cm/sec;

$h$ = slot height, cm; and $\mu$ = fluid viscosity, g/cm-sec.

In addition, it is believed that optimization of solvents and/or solid contents used in coating solutions can prevent significant diffusion between the coating solution layers. For example, the solvent ratios and/or the solids concentrations of the solutions can be varied to avoid layer diffusion. For example, if the alcohol or water content is too high or too low in one layer relative to the other, then significant diffusion and/or mixing of the layers can result. Significant diffusion and/or mixing of the layers can also arise where the solids content in one layer is significantly different then in an adjacent layer. Diffusion between the layers can render the coating unstable, causing the layers to repel each other and/or cause unacceptably poor thickness uniformity. Where excessive diffusion occurs, component migration results where segments of one or more layers diffuse into one or more of the other layers in the coating structure. In general, component migration can influence performance and/or durability of the final unitized electrode assembly ("UEA"). By UEA, we mean an assembly of the membrane, electrodes, and diffusion media as a unit with, for example, other components such as a subgasket, bipolar plates and the like.

Substrates

Suitable substrates may include, but are not limited to, diffusion media (DM), gas diffusion media (GDM), and nonporous substrates, such as polymer films (e.g., polyvinylidene fluoride (PVDF), fluoroethylene propylene, polypropylene, polyimide, polyester, or polytetrafluoroethylene (PTFE)), polymer-coated paper (e.g., polyurethane coated paper), silicone release paper, metal foil (e.g., aluminum foil), metallic supports (e.g., stainless steel support), a wheel with a chrome coating, or other nonporous materials. DMs and GDMs may include carbon-based substrates, such as carbon paper, woven carbon fabric or cloths, non-woven carbon fiber webs, which are highly porous and provide the reaction gases with good access to the electrodes. Carbon substrates that may be useful in the practice of the present invention may include: Toray™ Carbon Paper, SpectraCarb™ Carbon Paper, AFN™ non-woven carbon cloth, Zoltek™ Carbon Cloth, Zoltek® PWB-3, and the like. DMs and GDMs may also be treated with a hydrophobic component or microporous layer that may be permit removal of water from the fuel cell. The DMs and GDMs can be tailored specifically into anode-type GDMs or cathode-type GDMs, depending on into which side they are built in a given MEA. In some examples, a porous substrate may have a thickness ranging from about 100 micrometers to about 500 micrometers. In other examples, a porous substrate may have a thickness ranging from about 150 micrometers to about 300 micrometers. In some examples, a non-porous substrate may have a thickness ranging from about 10 micrometers to about 3200 micrometers. In other examples, a non-porous substrate may have a thickness ranging from about 20 micrometers to about 40 micrometers.

Nonporous Layer Solution

The non-porous layer solution comprises a membrane solution. The membrane solution may comprise any suitable polymer electrolyte. The polymer electrolytes useful in the present invention may be highly fluorinated and, in some examples, perfluorinated, but may also be partially fluorinated or non-fluorinated. Examples of fluorinated polymer electrolytes useful in the present invention can include copolymers of tetrafluoroethylene and one or more fluorinated, acid-functional co-monomers, tetrafluoroethylene-fluorovinyl ether copolymer, perfluorosulfonic acids (PFSAs), perfluorocyclobutanes (PFCBs), or mixtures thereof. The ionomer materials are used in a liquid composition, i.e. dissolved or dispersed in a suitable solvent. Many fluorine-containing ionomer materials can be obtained in the form of an aqueous solution in various concentrations. The ionomer content of the solutions may range from 5 to 30% by weight of the solution. Of course, ionomer materials supplied in the form of aqueous dispersions may also be used. Such dispersions may include, for example, Nafion® PFSA polymer dispersions sold by DuPont. Examples of fluorine-free, ionomer materials that may be used can include hydrocarbon polymers, sulfonated polyether ketones, aryl ketones, acid-doped polybenzimidazoles, sulfonated polysulfone, and sulfonated polystyrene. The membranes may generally be coated onto a substrate such that the wet thickness of the membrane layer ranges from about 50 µm to about 150 µm. In some examples, the membrane layer formed by the process may have a dry thickness ranging from about 3 µm to about 50 µm. In some examples, the membrane layer formed by the process may have a dry thickness ranging from about 4 µm to about 30 µm.

The membrane layer may use an ionomer having an equivalent weight (EW) of 1200 or less, in some examples 1100 or less, in other examples 1000 or less, in further examples 900 or less, and in even further examples 800 or less. By "equivalent weight" (EW) of an ionomer, it is meant the weight of ionomer required to neutralize one equivalent of base. In some examples, the membrane may comprise a blend of ionomers having a different EW.

In some examples, the membrane layer may be annealed after a drying step to help obtain the necessary durability. Membrane layers may also benefit from the use of optional reinforcement layers to improve the mechanical strength of the membrane so that it is less susceptible to stress-related failures. Examples of suitable reinforcement layers include expanded Teflon (ePTFE), metal screens, woven fabrics, and other suitable materials apparent to those of ordinary skill in the art. In some examples, the membrane and the reinforcement layer may be annealed together. In other examples, the electrode, membrane and reinforcement layer may be annealed together. Annealing can involve heating the membrane to a temperature above its glass transition temperature, then slowly cooling it down to form crystalline domains in an arrangement that imparts rigidity and strength to the membrane.

Ion-exchange membranes can degrade over time when subjected to the chemical environment found in a typical PEM fuel cell. One mechanism by which ion conducting polymer membranes may degrade is via loss of fluorine (i.e., fluoride emission) under open circuit voltage (OCV) and dry operating conditions at elevated temperatures. Another mechanism that may contribute to the degradation of an ion conducting polymer membranes is the reaction of the membrane with reactive species, such as hydrogen peroxide or hydroxyl radicals. To reduce membrane degradation, the use of chemical degradation mitigants may be required. Suitable chemical degradation mitigants that inhibit polymeric degradation may include cerium-containing compounds, manganese-containing compounds, and a porphyrin-containing compound. In one example, the mitigant comprises a platinum nanoparticle, $CeO_2$, or $MnO_2$. Other suitable examples may include a soluble sulfonate ($SO_4^{-2}$), carbonate ($CO_3^{-2}$) or nitrate ($NO_3^{-2}$) salt of any of the following metal ions alone, or in combination, $Co^{2+}$, $Co^{3+}$, $Fe^{2+}$, $Fe^{3+}$, $Mg^{1+}$, $Mg^{2+}$, $Mn^{1+}$, $Mn^{2+}$, $Mn^{3+}$, $Cl\,Mn^{3+}$, $Cu^{1+}$, $Cu^{2+}$, $Ni^{1+}$, $Ni^{2+}$, $Pd^{1+}$, $Pd^{2+}$, $Ru^{1+}$, $Ru^{2+}$, $Ru^{4+}$, $Vn^{4+}$, $Zn^{1+}$, $Zn^{2+}$, $Al^{3+}$, B, $Si(OH)_2^{2+}$, $Al^{3+}$, $HOIn^{3+}$, $Pb^{2+}$, $Ag^+$, $Sn^{2+}$, $Sn^{4+}$, $Ti^{3+}$, $Ti^{4+}$, $VO^+$, $Pt^{2+}$, $Ce^{3+}$, or $Ce^{4+}$.

Porous Layer Solution

In order to form a porous structure in the porous (e.g., electrodes) and/or microporous layers, where a non-porous solution layer is simultaneously formed over one or more porous solution layers, air must infiltrate the porous solution layer. Where the substrate is a DM or GDM, itself being a porous structure, the DM or GDM can provide a pathway for air to fill the electrode and/or microporous solutions such that porous and microporous layers are formed when dried. Where the substrate is a non-porous substrate, an obvious pathway for air infiltration of the porous and/or microporous solutions does not exist. However, it has been unexpectedly found that simultaneously coating of a non-porous and porous electrode solution layer on a non-porous substrate resulted in a separate layer structure with an obvious pore structure in the electrode. Without being bound by theory, it is believed that dissolved air in the porous electrode/microporous solution is released during the drying step as shown in FIGS. 1, 3, 5 & 7 to form the porous electrode layer.

The porous layer solution may comprise electrode ink, which may be used to form a cathode layer or an anode layer. The electrode ink comprises a solvent, an ionomer, and a catalyst. The electrode ink may be prepared by adding catalyst and milling media to a bottle, along with the solvent and ionomer to form a catalyst solution. The catalyst solution may then be milled by, for e.g., placing the bottle containing the catalyst solution on a ball mill and rotating the bottle in the presence of milling media.

Any suitable catalyst may be used in the practice of the present invention. In some examples, the catalyst may be catalyst metal coated onto the surface of an electrically conductive support. Generally, carbon-supported catalyst particles are used. Carbon-supported catalyst particles are about 50-90% carbon and about 10-50% catalyst metal by weight. The catalyst may be a finely divided precious metal having catalytic activity. Suitable precious metals include, but are not limited to, platinum group metal, such as platinum, palladium, iridium, rhodium, ruthenium, and their alloys.

The solvent may include isopropyl alcohol, methanol, ethanol, n-propanol, n-butyl alcohol, sec-butyl alcohol, tert-butyl alcohol, water, 2-methyl-2-butanol, 2-methyl-2-pentanol, 2,3-dimethyl-2-butanol, 2,3-dimethyl-2,3-butanediol, 2,4-dimethyl-2,4-pentanediol, 2,4-dimethyl-2,4-hexanediol, 2,5-dimethylhexan-2,5-diol, 3-hydroxy-3-methyl-2-butanone and 4-hydroxy-4-methyl-2-pentanone (diacetone alcohol) and mixtures thereof. The solvent may be present in the ink in an amount of from 1 to 90% by weight, in some examples from 5 to 80% by weight, and in further examples from 10 to 50% by weight of the electrode ink.

The electrode ink comprises ionomer material, which may or may not be the same ionomer material used in the non-porous layer solution. Suitable ionomer materials include, but are not limited to, copolymers of tetrafluoroethylene and one or more fluorinated, acid-functional co-monomers, tetrafluoroethylene-fluorovinyl ether copolymer, perfluorosulfonic acids (PFSAs), perfluorocyclobutanes (PFCBs), hydrocarbon polymers, sulfonated polyether ketones, aryl ketones, acid-doped polybenzimidazoles, sulfonated polysulfone, sulfonated polystyrene, and mixtures thereof. Generally, the ionomer materials in the ink should be used in a liquid composition, i.e. dissolved or dispersed in a suitable solvent. Many fluorine-containing ionomer materials can be obtained in the form of an aqueous solution in various concentrations. The ionomer content of the solutions may range from 5 to 30% by weight of the solution. Of course, ionomer materials supplied in the form of aqueous dispersions may also be used. Such dispersions may include, for example, Nafion® PFSA polymer dispersions sold by DuPont. As described in further detail below, the ionomer materials in the ink may be a low EW ionomer, a high EW ionomer or a blend of ionomer materials having a high EW and a low EW.

As noted above, the catalyst is applied to the substrate in the form of a catalyst ink. The catalyst ink may comprise a dispersion of catalyst particles on a carbon support in an ionomer dispersion. The ink may contain 5-30% solids (i.e. ionomer and catalyst) and, in some examples, may contain 10-20% solids. The solids contained in the ink have a particle size diameter ranging from about 0.01 micrometers to about 15 micrometers in some examples. In other examples, the solids contained in the ink have a particle size diameter ranging from about 0.1 micrometers to about 10 micrometers. In some examples, the solids contained in the ink may also have a particle size distribution such that at least 80% of the solids have a particle size diameter ranging from about 0.01 micrometers to about 15 micrometers. In some examples, the solids contained in the ink may also have a particle size distribution such that at least 80% of the solids have a particle size diameter ranging from about 0.01 micrometers to about 10 micrometers. In other examples, the solids contained in the ink may also have a particle size distribution such that at least 90% of the solids have a particle size diameter ranging from about 0.01 micrometers to about 15 micrometers. In some examples, the solids contained in the ink may also have a particle size distribution such that at least 90% of the solids have a particle size diameter ranging from about 0.01 micrometers to about 10 micrometers.

Other additives, such as binders, cosolvents, crack reducing agents, wetting agents, antifoaming agents, surfactants, anti-settling agents, preservatives, pore formers, leveling agents, stabilizers, pH modifiers, milling aids and other substances, can be used in the catalyst ink composition to improve coatablity. Furthermore, basic agents such as sodium hydroxide (NaOH) or potassium hydroxide (KOH) can be added for buffering of the acid groups of the ionomer.

In some examples, a crack reducing agent is added to the catalyst electrode ink. Electrodes made from catalyst ink can form a network of cracks on the surface, which is called "mud cracking." It is believed that "mud cracking" occurs due to the stresses that develop as wet film dries and the solid materials begin to consolidate. Not wishing to be bound by theory, the cracks may form due to stress gradients resulting from local thickness differences in the wet film. The cracks may also form following drying due to an inherent weakness of the electrode. The electrode is formed from a porous matrix of the carbon support bound by the ionomer, which is a relatively weak binder. As a result, the matrix of the carbon support provides minimal reinforcement to the ionomer, and the resulting matrix may not withstand the substantial stresses during the drying of the catalyst ink, resulting in a greater opportunity for the cracks to form during operation of the fuel cell. If the tensile strength of the film is in sufficient to overcome the induced drying stress, mud cracks can form to relieve the film of the stress. Thus, a crack reducing agent may be added to the catalyst electrode ink to prevent the formation of mud cracks.

Examples of suitable crack reducing agents can include, but are not limited to, the addition of relatively high boiling solvents, for example, diacetone alcohol, carbon fibers, nanoclay platelets (for example available from Southern Clay Product of Gonzales, Tex.), or a mixture of low equivalent weight ionomers and high equivalent weight ionomers, or combinations thereof. The diacetone alcohol may be present in an amount up to about 30 wt. % of a cathode ink. The carbon fibers may be about 10-20 micrometers in length and 0.15 µm in diameter. The carbon fibers may be present in a ratio of about 1:6 (w/w) fibers:catalyst. In addition, as disclosed above, the catalyst ink comprises ionomer material. Low equivalent weight (less than about 800 EW) ionomers or a mixture of low equivalent weight ionomers and high equivalent weight ionomers (greater than about 800 EW) may be used to mitigate the occurrence of mud cracks. In some examples, the ionomer material may be a mixture of ionomers having a high equivalent weight of greater than about 850 and a low equivalent weight of less than about 750.

Microporous Layer Solution

The microporous layer is a porous layer used in fuel cells to wick excess liquid water away from the cathode catalyst and diffusion layer interface, and to provide performance improvement under wet operating conditions. It can be added as a discrete layer to one or both faces of a diffusion media substrate. The microporous layer solution is generally a dispersion comprising various blends of carbon particles, hydrophobic polymers, and solvent. The term "carbon particles" is used to describe carbon in any finely divided form, (the longest dimension of any of the particles is suitably less than 500 µm, less than 300 µm, less than 50 µm) including carbon powders, carbon flakes, carbon nanofibers or microfibers, and particulate graphite. The carbon particles may be carbon black particles. Examples of suitable hydrophobic polymers may include polytetrafluoroethylene (PTFE), polyvinylidene fluoride (PVDF), fluoroethylene propylene (FEP), or other organic or inorganic hydrophobic polymer materials. The carbon particles and hydrophobic polymer may be dispersed in a liquid, which may be, for example, an organic solvent, water and mixtures thereof. In some examples, the solvent may include at least one of isopropyl alcohol, methanol, ethanol, n-propanol, n-butyl alcohol, sec-butyl alcohol, tert-butyl alcohol, water, 2-methyl-2-butanol, 2-methyl-2-pentanol, 2,3-dimethyl-2-butanol, 2,3-dimethyl-2,3-butanediol, 2,4-dimethyl-2,4-pentanediol, 2,4-dimethyl-2,4-hexanediol, 2,5-dimethylhexan-2,5-diol, 3-hydroxy-3-methyl-2-butanone, 4-hydroxy-4-methyl-2-pentanone (diacetone alcohol) and mixtures thereof. As shown in FIG. 3, the microporous layer solution may be simultaneously applied with other coating solutions onto a gas diffusion media layer.

For microporous layers useful in simultaneous coating applications, it may be useful to tailor and/or control various properties of the composition, such as particle size, particle density, binder loading, porosity, pore-size distribution, and layer thickness. The microporous layer formed after drying the microporous layer solution may comprise, in some examples, about 50%-90% of carbon particles, and about 10%-45% of hydrophobic polymer. The microporous layer may be between 2 µm and 100 µm thick, and in some examples between 10 µm and 70 µm thick. The porosity of the microporous layer can suitably be greater than 50%, and in some examples, greater than 70%. The pore sizes in the microporous layer may cover a wide range, e.g. from 5 nm up to 10 µm.

The embodiments described herein may be further illustrated by the following non-limiting examples.

EXAMPLES

Except where noted, a 2-layer slot die moving relative to the substrates was used in all examples. Catalyst loadings for electrodes were determined gravimetrically. Membrane thickness was determined via scanning electron microscopy ("SEM") using membrane cross sections. The coated parts were dried via infrared drying. Where noted, expanded Teflon (ePTFE) was affixed to the wet membrane before substantial drying took place.

Example 1

Inventive MEA

Cathode ink was prepared by adding 6.02 grams of a 30% Pt-alloy catalyst (supplied by Tanaka Kikinzoku International) and 600 grams of 5 millimeter spherical zirconia milling media to a first 250 ml polyethylene bottle. In a second 250 ml polyethylene bottle, 10.1 grams of a 900 equivalent weight (EW) ionomer (28 wt. % solids, 42 wt. % ethanol, 30 wt. % water) and 4.53 grams of a 700 EW ionomer (20.5 wt. % solids, 79.5 wt. % water) were added to the second bottle, along with 34.11 grams of ethanol, 19.33 grams of water and 0.89 grams of a solution comprising 26.7 wt. % oleylamine, 55 wt. % n-propanol and 18.3 wt. % water. The contents were stirred for about 15 minutes. The ionomer solution from the second bottle was then added to the catalyst and milling media in the first bottle. The first bottle was then placed on a ball mill and rotated at 125 RPMs for 72 hrs.

A non-porous membrane solution was prepared by adding 104.7 grams of an ionomer dispersion (DuPont Nafion D2020 at 21.4 wt. % solids, 33.1 wt. % water and 45.5 wt. % n-propanol), 44.1 grams of n-propanol and 11.2 grams of water to a 250 ml polyethylene bottle. The solution was allowed to mix overnight.

On the surface of a piece of GDM (supplied by Freudenberg FCCT KG), the non-porous membrane solution and cathode ink were simultaneously coated under laminar flow onto the GDM substrate such that the non-porous membrane layer was simultaneously coated on the cathode ink layer to form a wet composite structure. The wet film thickness of the cathode ink layer was 92 micrometers, and had a Pt loading of 0.2 milligrams/cm$^2$. The wet film thickness of the membrane layer was 113 micrometers, and had a dry thickness of about 7-9 micrometers. After the two layers were coated and before any substantial drying took place, a piece of ePTFE (Donaldson D1326) was placed on the wet membrane surface. After applying the ePTFE, the wet composite structure was then allowed to sit for 10 to 30 seconds allowing the ePTFE to be fully imbibed in the membrane solution. The wet composite structure was then dried under an infrared lamp with a source temperature of 450° F. for about 10 minutes to form a dry cathode composite structure having a substrate, a cathode formed on the substrate, and a non-porous membrane formed on the cathode.

Anode ink was prepared by adding 6.62 grams of a 20% Pt of graphitized Vulcan catalyst (supplied by Tanaka Kikinzoku International) and 520 grams of 5 millimeter spherical zirconia milling media were added to a first 250 ml polyethylene bottle. In a second 250 ml polyethylene bottle, 22.53 grams of a 900 equivalent weight (EW) ionomer (28 wt. % solids, 42 wt. % ethanol, 30 wt. % water), 20.75 grams of ethanol, 13.72 grams of water and 1.39 grams of a 26.7 wt. % oleylamine, 55 wt. % n-propanol and 18.3 wt. % water solution were added and the contents stirred for 15 minutes. The ionomer solution from the second bottle was then added to the catalyst and milling media in the first bottle. The first bottle was then placed on a ball mill and rotated at 125 RPMs for 72 hrs. The same non-porous membrane solution that was used with the cathode ink described above was also used for the anode ink.

On the surface of a piece of GDM (supplied by Freudenburg FCCT KG), the non-porous membrane solution and anode ink were simultaneously coated under laminar flow onto the GDM substrate such that the non-porous membrane layer was simultaneously coated on the anode ink layer to form a wet composite structure. The wet film thickness of the anode ink layer was 25 micrometers, and had a Pt loading of 0.05 milligrams/cm$^2$. The wet film thickness of the membrane was 113 micrometers, and had a dry thickness of about 7-9 micrometers. The wet composite structure was then placed under an infrared lamp with a source temperature of 450° F. for about 10 minutes to form a dry anode composite structure having a substrate, an anode formed on the substrate, and a non-porous membrane formed on the anode.

The cathode composite structure and the anode composite structure were hot pressed together to form an inventive MEA.

Reference MEA

A reference MEA was also prepared. To form the reference MEA, a cathode ink was prepared by adding 6.02 grams of a 30% Pt-alloy catalyst (supplied by Tanaka Kikinzoku International) and 300 grams of 5 millimeter spherical zirconia milling media to a first 250 ml polyethylene bottle. In a second 250 ml polyethylene bottle, 23.8 grams of a 900 EW ionomer (28 wt. % solids, 42 wt. % ethanol, 30 wt. % water) was added. along with 35.68 grams of n-propanol, 8.1 grams of water and 1.47 grams of a 26.7 wt. % oleylamine, 55 wt. % n-propanol and 18.3 wt. % water solution. The contents were stirred for about 15 minutes. The ionomer solution from the second bottle was then added to the catalyst and milling media in the first bottle. The first bottle was then placed on a ball mill and rotated at 125 RPMs for 24 hrs.

In forming the reference MEA, an anode ink was also prepared by adding 6.41 grams of a 20% Pt of graphitized Vulcan catalyst (supplied by Tanaka Kikinzoku International) and 500 grams of 5 millimeter spherical zirconia milling media were added to a first 250 ml polyethylene bottle. In a second 250 ml polyethylene bottle, 16.07 grams of a 900 equivalent weight (EW) ionomer (28 wt. % solids, 42 wt. % ethanol, 30 wt. % water), 78.87 grams of ethanol, 23.65 grams of water were added and the contents stirred for 15 minutes. The ionomer solution from the second bottle was then added to the catalyst and milling media in the first bottle. The first bottle was then placed on a ball mill and rotated at 125 RPMs for 24 hrs.

On the surface of separate pieces of GDM (supplied by Freudenburg FCCT KG), the anode ink and cathode inks were coated using a Mayer rod with final loadings of 0.05 and 0.20 milligrams Pt/cm$^2$, respectively. A 5 wt. % ionomer solution was sequentially coated on each electrode to a final loading of 0.16 milligrams ionomer/cm$^2$. A piece of membrane (supplied by W.L. Gore & Associates), having a thickness of 18 micrometers was placed between the two electrodes and hot pressed to form the reference MEA.

Figure 9:
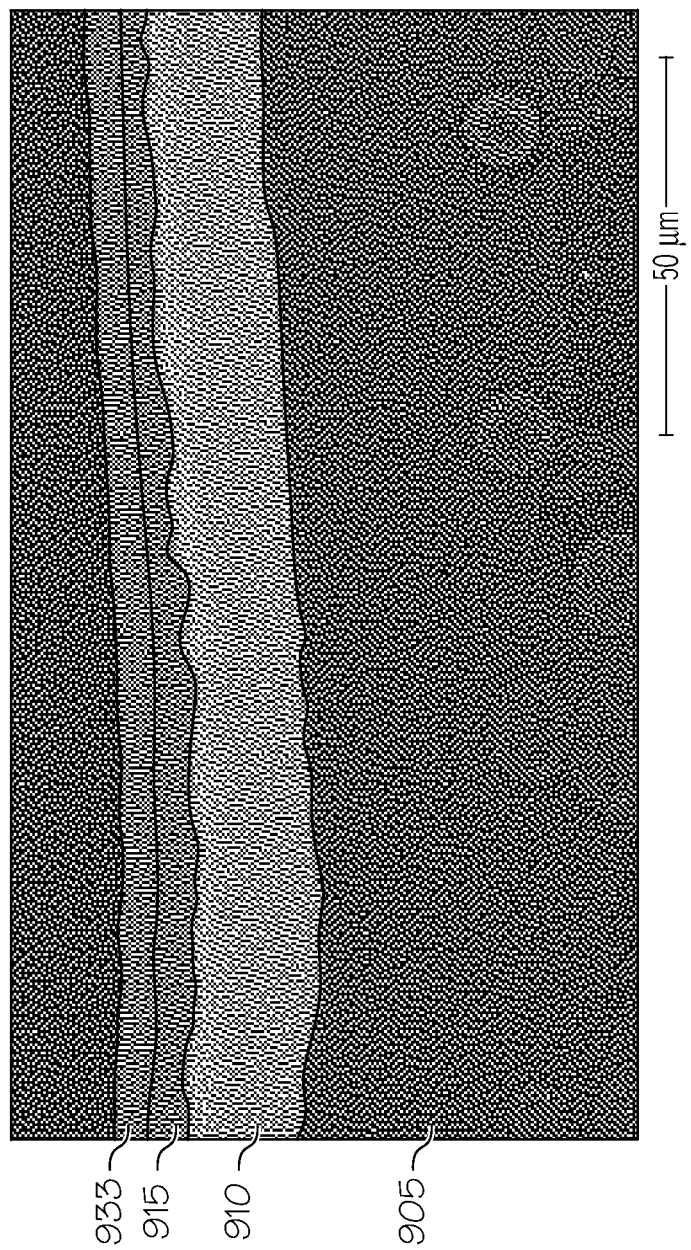
FIG. 9 depicts a scanning electron micrograph of a 2-layer membrane cathode cross-section.
Figure 10:
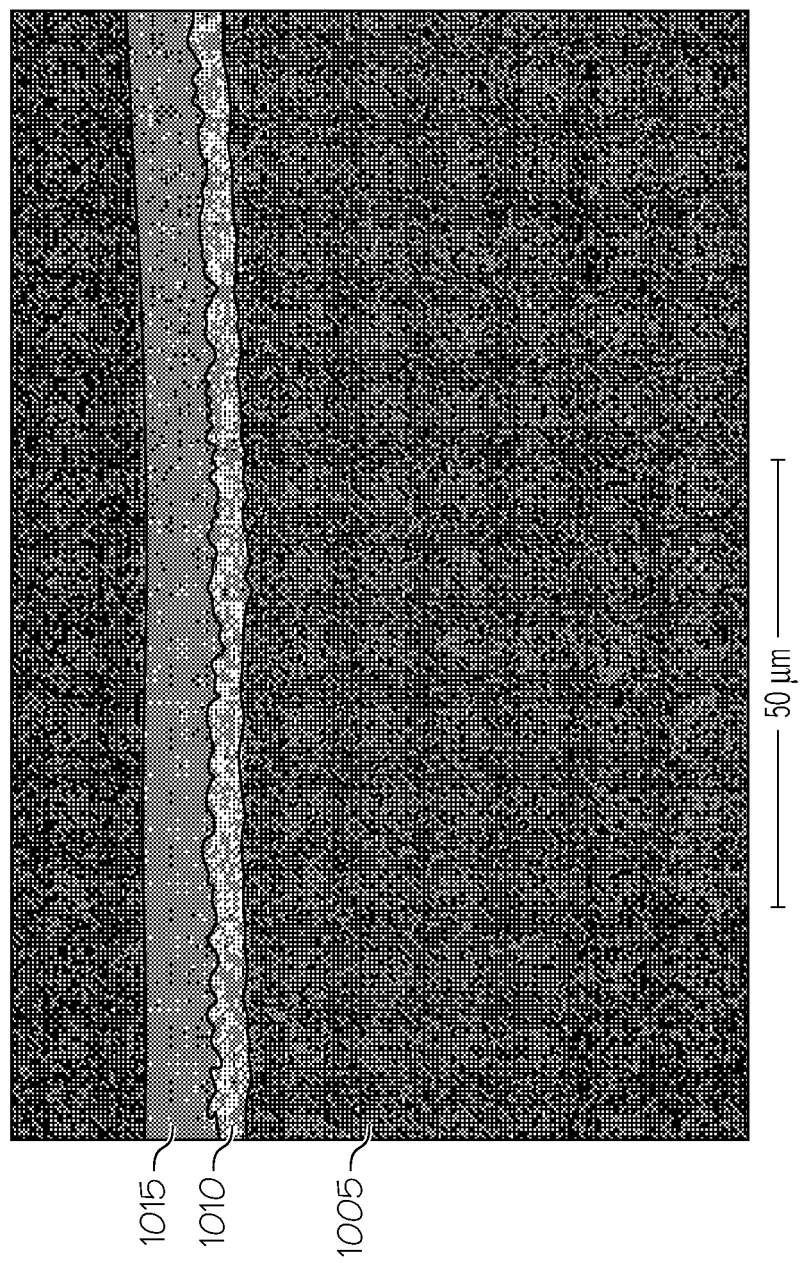
FIG. 10 depicts a scanning electron micrograph of a 2-layer membrane anode cross-section.

Referring to FIGS. 9 & 10, depicted are scanning electron micrographs of the cathode composite and the anode composite formed. FIG. 9 shows the cathode (910), membrane (915) and ePTFE layers (933) formed on a substrate (905) according to the inventive process described in Example 1. FIG. 10 shows the anode (1010) and membrane layers (1015) formed on a substrate (1005) according to the inventive process described in Example 1.

Figure 11:
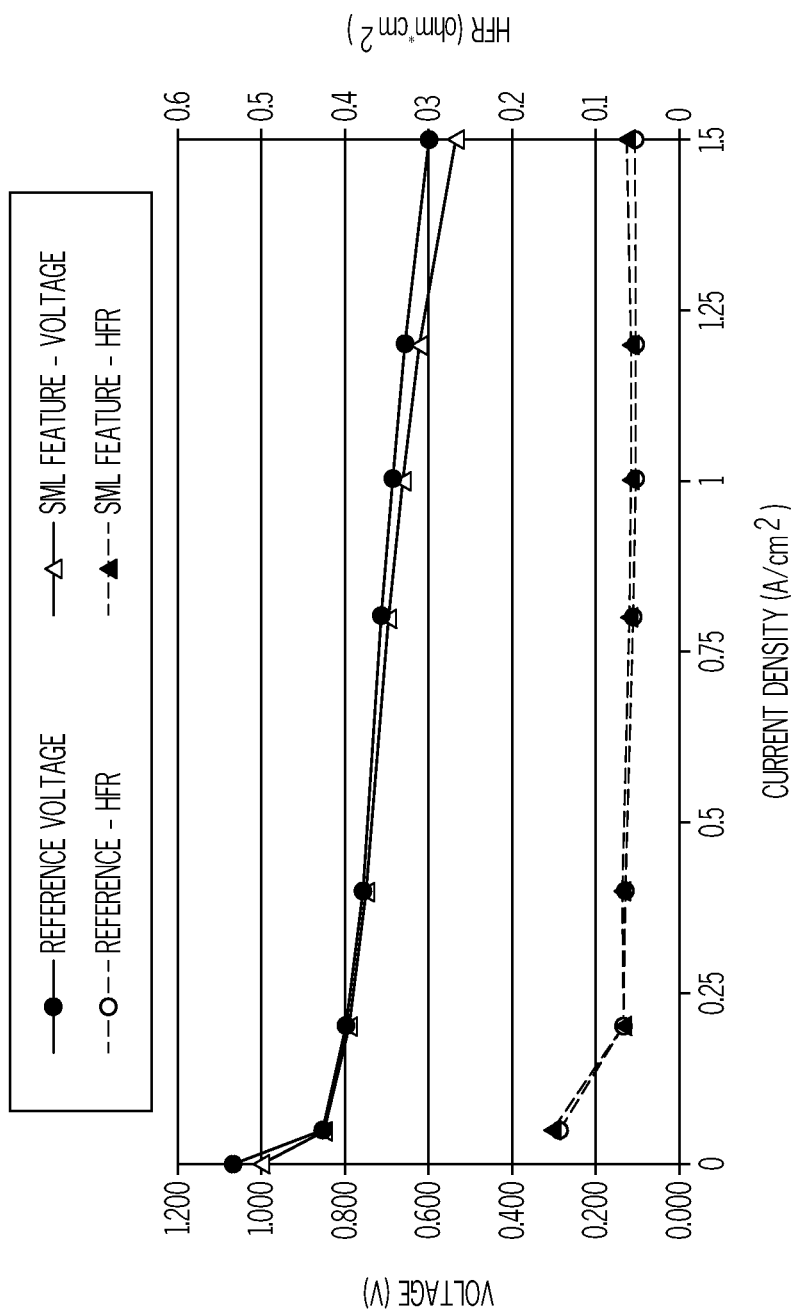
FIG. 11 depicts a chart comparing performance of a fuel cell formed according to one or more embodiments shown and/or described herein.

FIG. 11 depicts the 50 cm$^2$ beginning of life (BOL) fuel cell performance of the simultaneously coated multi-layer fuel cell (SML MEA) of inventive Example 1 and a reference MEA. The SML MEA and reference MEA were tested under the same operating conditions. BOL testing involves polarization curve testing of the SML MEA and a reference MEA under different operating conditions (e.g., temperatures, relative humidity (RH), stoichiometry, and the like.). As shown in FIG. 11, the SML MEA performed equally as well as the reference MEA.

Example 2

A microporous layer solution was prepared by adding 480 grams of a 5 millimeter spherical zirconia milling media, 10.29 grams of Superior Graphite Grade PureBlack SCD205-110 and 2.06 grams of Ultraflon 8TA PTFE (sintered at 300° C. for 45 minutes) to a 500 ml polyethylene bottle and shaking the contents for several minutes. Added to the bottle was 55.86 grams of water, 31.0 grams of n-propanol, 11.44 grams of 1M $HNO_3$ and 9.35 grams of ionomer (DuPont Nafion DE2020, 21.4 wt. % solids, 33.1 wt. % water and 45.5 wt. % n-propanol) were added to the bottle and placed on a ball mill at 125 RPM for 24 hrs.

The cathode ink was prepared by adding 16.89 grams of 50% Pt on graphitized Vulcan carbon catalyst (supplied by Tanaka Kikinzoku International) and 520 grams of 5 millimeter spherical zirconia milling media to a first 500 ml polyethylene bottle. In a second bottle, 10.7 grams of n-propanol, 39.0 grams of diacetone alcohol and 4.8 grams of water were added and the contents thoroughly mixed. This solution in the second bottle was added to the catalyst and milling media in the first bottle and the contents were shaken to wet the catalyst. Added to the first bottle was 58.6 grams of ionomer solution (DuPont Nafion DE2020, 21.4 wt. % solids, 33.1 wt. % water and 45.5 wt. % n-propanol) and the bottle placed on a ball mill rotating at 145 RPMs for 24 hrs.

The membrane solution was supplied by DuPont Nafion DE2020, 21.4 wt. % solids, 33.1 wt. % water and 45.5 wt. % n-propanol.

On the surface of a piece of GDM (supplied by Freudenburg FCCT KG), the microporous solution, cathode ink and membrane solution were simultaneously coated under laminar flow onto the GDM substrate using a three-layer slot die to form a wet composite structure. Simultaneous coating was carried out such that the cathode ink was simultaneously coated on a microporous layer solution and the membrane solution was simultaneously coated on the cathode ink. The wet composite structure was then dried under an infrared lamp with a source temperature of 450° F. for about 10 minutes to form a dry composite structure having a substrate, a microporous layer formed on the substrate, a cathode formed on the microporous layer, and a non-porous membrane formed on the cathode.

Figure 12:
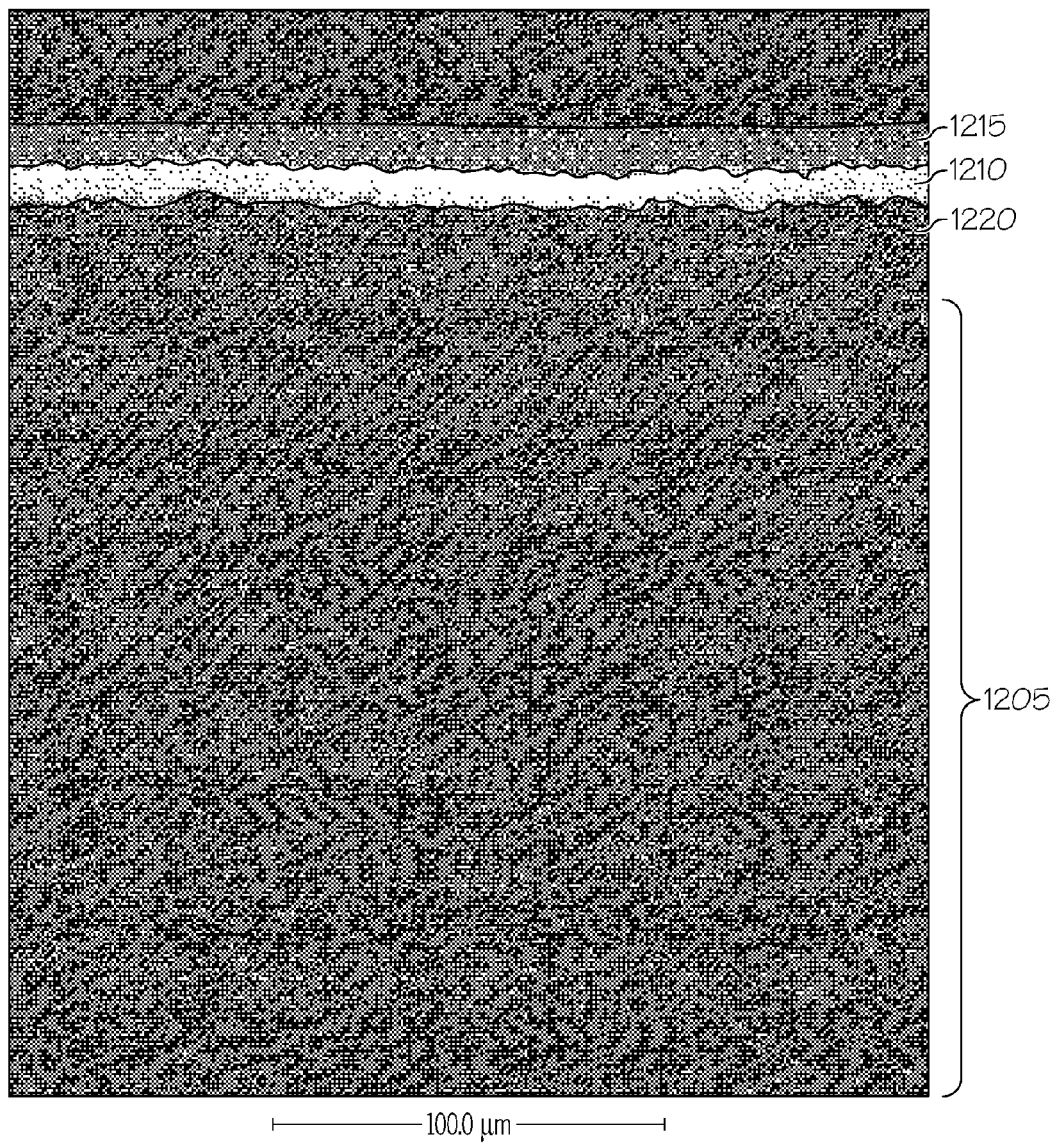
FIG. 12 depicts a scanning electron micrograph of a 3-layer microporous layer, membrane and cathode cross-section.

The wet film thickness of the microporous layer was 154 micrometers and resulted in a dry thickness of about 25 micrometers. The wet film thickness of the cathode was 62 micrometers, and resulted in a loading of 0.4 milligrams Pt/cm$^2$. The wet film thickness of the membrane was 85 micrometers resulting in a dry thickness of about 10 micrometers. The 3-layer structure was then placed under an IR lamp with a source temperature of 400° F. for 10 minutes to form a dry cathode composite structure. A scanning electron micrograph of the dry cathode composite structure can be seen in FIG. 12, which shows a microporous layer (1220) formed on substrate (1205), a cathode layer (1210) formed on the microporous layer (1220), and a membrane layer (1215) formed on the cathode layer (1210).

An anode ink was prepared as described above in inventive Example 1. The membrane solution is the same that was prepared and used with the cathode ink. On the surface of a piece of GDM (supplied by Freudenburg FCCT KG), the anode ink and membrane solution were simultaneously coated under laminar flow onto the GDM substrate using a 2-layer slot die to form a wet composite structure. Simultaneous coating was carried out such that the anode ink was simultaneously coated on the GDM and the membrane solution was simultaneously coated on the anode ink. The wet composite structure was then dried under an infrared lamp with a source temperature of 450° F. for about 10 minutes to form a dry anode composite structure.

Figure 13:
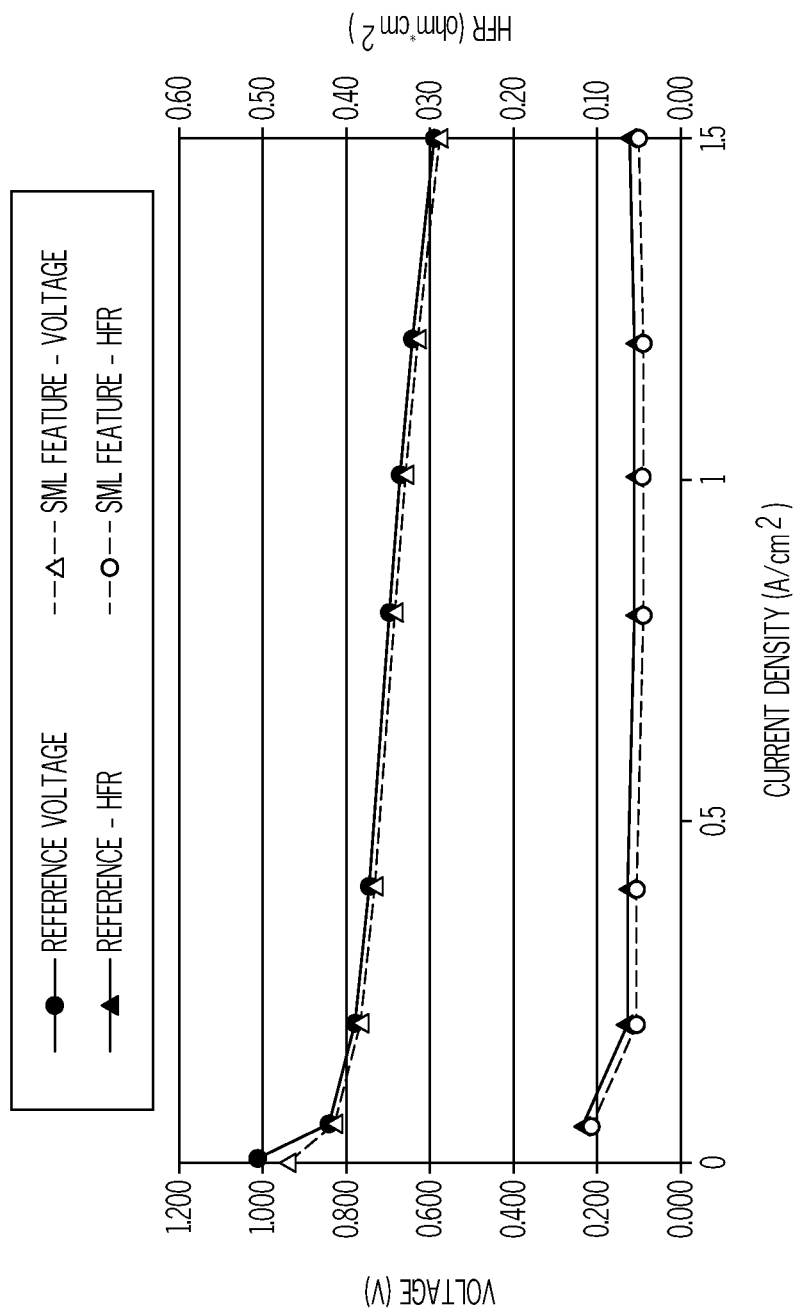
FIG. 13 depicts a chart comparing performance of a fuel cell formed according to one or more embodiments shown and/or described herein.

FIG. 13 depicts a typical polarization curve comparison of the inventive sample of Example 2 and a reference sample. The inventive sample of Example 2 was run at 80° C., 32% relative humidity, and 150 kPa abs. The reference sample was as made in Example 1. The voltage and high frequency resistance (HFR) were measured at various current densities. As shown, the Example 2 inventive fuel cell and the reference fuel cell performed equally as well.

Example 3

Figure 14:
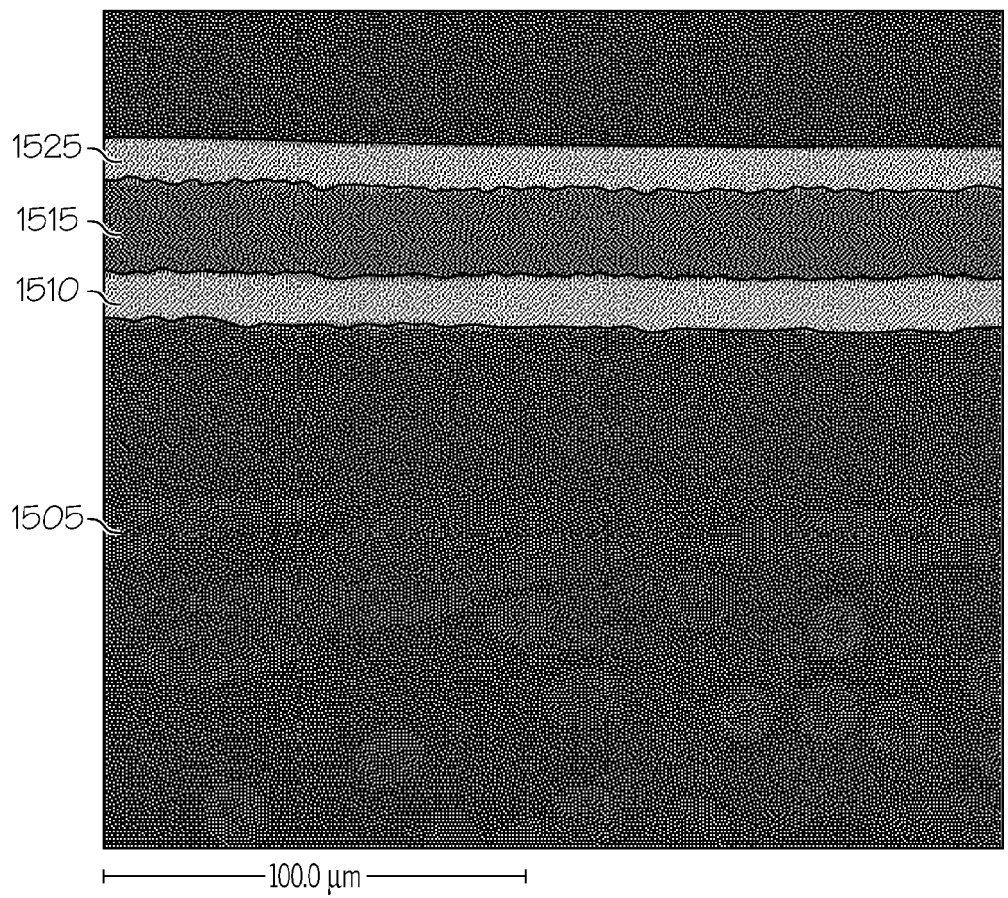
FIG. 14 depicts a scanning electron micrograph of a 3-layer anode, membrane and cathode cross-section.

A 3-layer slot die was used to simultaneously coat cathode, membrane and anode layers onto a piece of GDM (supplied by Freudenburg FCCT KG) to form a wet composite structure. Simultaneous coating was carried out under laminar flow such that the membrane solution was simultaneously coated on the cathode ink and the anode ink was simultaneously coated on the membrane solution. The wet composite structure was then dried under an infrared lamp with a source temperature of 450° F. for about 10 minutes to form a dry composite structure. FIG. 14 depicts a SEM of the dry composite structure having a substrate (1405), a cathode (1410) formed on the substrate (1405), a non-porous membrane (1415) formed on the cathode (1410), and an anode (1420) formed on the non-porous membrane (1415).

The cathode and anode inks used the same formulation and were prepared by adding 22.22 grams of a 50% Pt on Vulcan catalyst (supplied by Tanaka Kikinzoku International), 3.37 grams carbon fibers (10-20 micrometers long, 0.15 micrometers wide supplied by Showa Denko Carbon, Inc.) and 1360 grams of 5 millimeter spherical zirconia milling media to a 500 ml polyethylene bottle. In a separate bottle, 76.26 grams of ionomer solution (DuPont Nafion DE2020, 21.4 wt. % solids, 33.1 wt. % water and 45.5 wt. % n-propanol), 61.26 grams of n-propanol, 6.74 grams of water and 3.52 grams of a 26.7 wt. % oleylamine solution were added and the contents stirred for about 15 minutes. The ionomer solution was added to the catalyst, carbon fibers and milling media in the first bottle. The first bottle was placed on a ball mill rotating at 145 RPMs for 96 hrs. The membrane solution was DuPont Nafion DE2020, 21.4 wt. % solids, 33.1 wt. % water and 45.5 wt. % n-propanol.

The anode and cathode layers were coated to have the same wet film thickness and Pt loading. The wet film thickness of the anode and cathode layers was 65 micrometers resulting in a loading 0.4 milligrams Pt/cm$^2$ for each electrode. The wet film thickness of the membrane was 122 micrometers, resulting in a nominal dry thickness of 14 micrometers. The 3-layer structure was then placed under an IR lamp with a source temperature of 500° F. for 10 minutes to form a dry composite structure.

Example 4

A 2-layer slot die was used to simultaneously coat the electrode and membrane layers on a non-porous polymer film (1.2 millimeter Kapton FN manufactured by DuPont). The cathode ink was prepared by adding 11.88 grams of a 50% Pt on Vulcan catalyst (supplied by Tanaka Kikinzoku International), 1.82 grams carbon fibers (10-20 micrometers long, 0.15 micrometers wide supplied by Showa Denko Carbon, Inc.), and 800 grams of 5 millimeter spherical zirconia milling media to a first 500 ml polyethylene bottle. In a second 500 ml polyethylene bottle, 31.43 grams of a 900 equivalent weight (EW) ionomer (28 wt. % solids, 42 wt. % ethanol, 30 wt. % water), 46.4 grams of ethanol and 10.3 grams of water were added and the contents stirred for about 15 minutes. The ionomer solution was added to the catalyst, carbon fibers and milling media in the first bottle. The first bottle was placed on a ball mill rotating at 145 RPMs for 72 hrs. A 16 wt. % solids membrane solution was prepared by adding 57.1 grams of a 900 equivalent weight (EW) ionomer (28 wt. % solids, 42 wt. % ethanol, 30 wt. % water) and 10.7 grams of water.

The anode ink was prepared by adding 11.88 grams of a 20% Pt graphitized Vulcan catalyst (supplied by Tanaka Kikinzoku International), and 1200 grams of 5 millimeter spherical zirconia milling media to a first 500 ml polyethylene bottle. In a second 500 ml polyethylene bottle, 56.64 grams of a 900 equivalent weight (EW) ionomer (28 wt. % solids, 42 wt. % ethanol, 30 wt. % water), 47.0 grams of ethanol, 30.3 grams of water, 1.7 grams of a 26.7 wt. % oleylamine, 55 wt. % n-propanol and 18.3 wt. % water solution were added and the contents stirred for about 15 minutes. The ionomer solution was added to the catalyst and milling media in the first bottle. The first bottle containing the mixed solution was placed on a ball mill rotating at 145 RPMs for 48 hrs.

Figure 15:
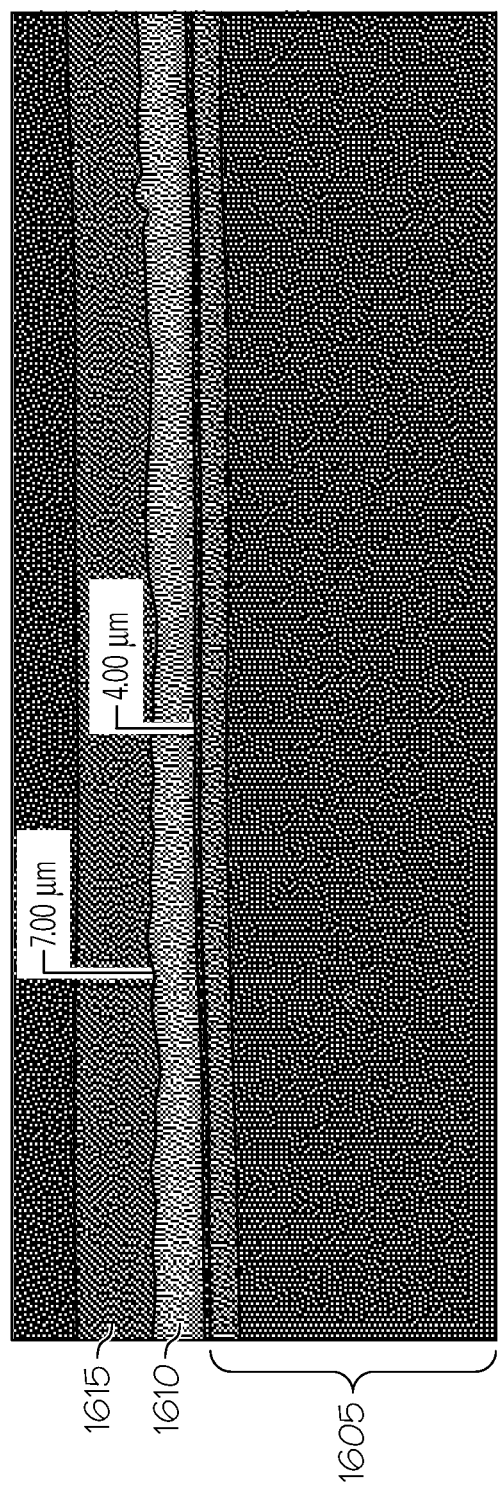
FIG. 15 depicts a scanning electron micrograph of a 2-layer membrane and cathode cross-section.
Figure 16:
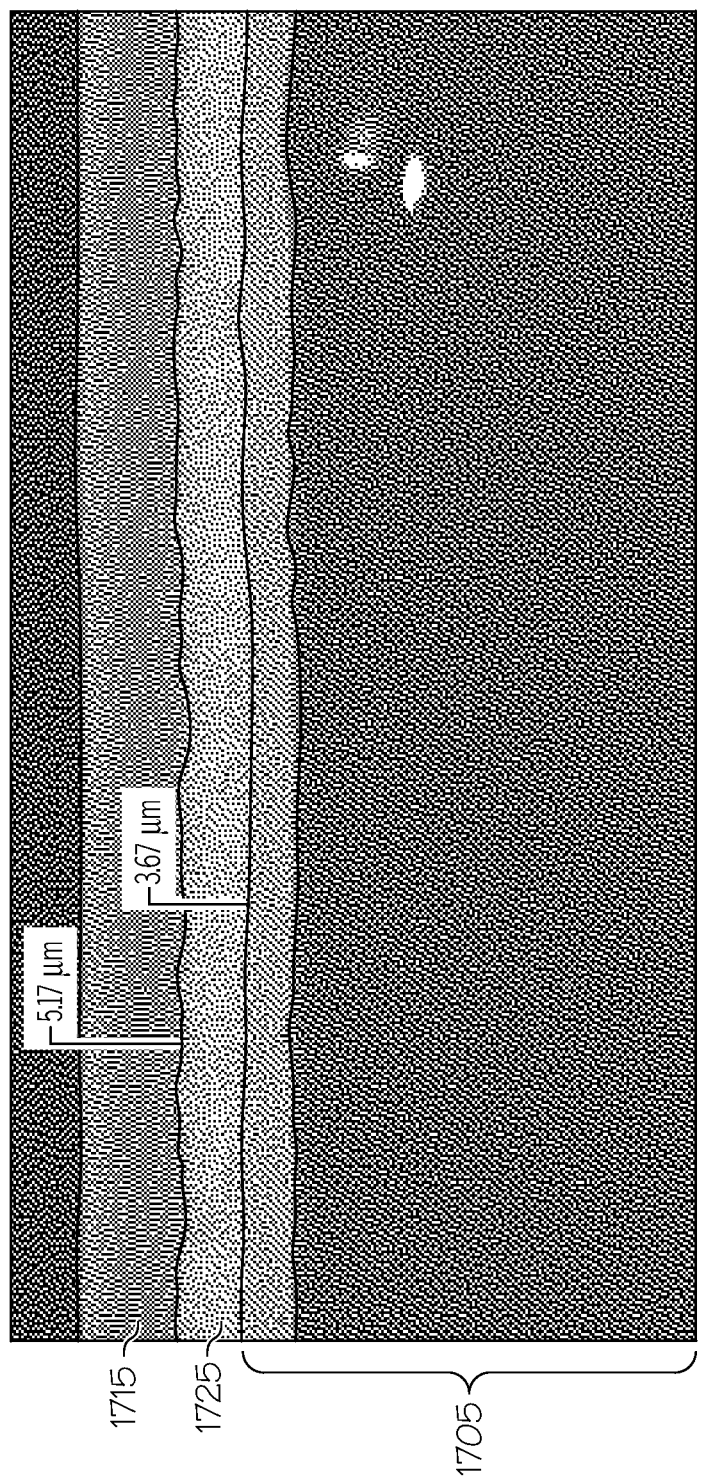
FIG. 16 depicts a scanning electron micrograph of a 2-layer membrane and anode cross-section.

The resulting cathode and anode composite structures are shown in FIGS. 15 & 16. FIG. 15 depicts a scanning electron micrograph of the dry cathode composite structure having a cathode layer (1510) formed on a non-porous substrate (1505) and a membrane layer (1515) formed on the cathode layer (1510). FIG. 16 depicts a scanning electron micrograph of the dry anode composite structure, which shows the dry anode composite structure has a substrate (1605), an anode layer (1625) formed on the non-porous substrate (1605), and a non-porous membrane (1615) formed on the anode layer (1625).

Example 5

A cathode ink and an anode ink were prepared as described in inventive Example 1.

A non-porous membrane solution was prepared by adding 104.7 grams of an ionomer dispersion (DuPont Nafion D2020 at 21.4 wt. % solids, 33.1 wt. % water and 45.5 wt. % n-propanol), 105.5 mg of cerium (III) carbonate, 44.1 grams of n-propanol, and 11.2 grams of water to a 250 ml polyethylene bottle. The solution was allowed to mix overnight.

Four membrane electrode assemblies were formed as follows. On the surface of a piece of GDM (supplied by Freudenberg FCCT KG), the non-porous membrane solution and cathode ink were simultaneously coated under laminar flow onto the GDM substrate such that the non-porous membrane layer was simultaneously coated on the cathode ink layer to form a wet composite structure. After the two layers were coated and before any substantial drying took place, a piece of ePTFE (Donaldson D1326) was placed on the wet membrane surface. After applying the ePTFE, the wet composite structure was then allowed to sit for 10 to 30 seconds allowing the ePTFE to be fully imbibed in the membrane solution. The wet composite structure was then dried under an infrared lamp with a source temperature of 450° F. for about 10 minutes to form a dry cathode composite structure having a substrate, a cathode formed on the substrate, and a non-porous membrane formed on the cathode. The dry cathode composite structure was annealed at 180° C. for 15 minutes in an inert nitrogen atmosphere.

On the surface of a piece of GDM (supplied by Freudenburg FCCT KG), the non-porous membrane solution (four assemblies using the first non-porous membrane solution and four assemblies using the second non-porous membrane solution) and anode ink were simultaneously coated under laminar flow onto the GDM substrate such that the non-porous membrane layer was simultaneously coated on the anode ink layer to form a wet composite structure. The wet composite structure was then placed under an infrared lamp with a source temperature of 450° F. for about 10 minutes to form a dry anode composite structure having a substrate, an anode formed on the substrate, and a non-porous membrane formed on the anode. The dry anode composite structure was annealed at 180° C. for 15 minutes in an inert nitrogen atmosphere.

The cathode composite structure and the anode composite structure were hot pressed together to form four MEAs. The four membrane electrode assemblies were assembled into a fuel cell stack to form unitized electrode assemblies (UEA).

Stack durability testing was performed according to the U.S. Council for Automotive Research LLC's Accelerated Testing and Polarization Curve Protocols for PEM Fuel Cells, Protocol for Determining Cell/Stack Durability. The testing procedure for hydrogen crossover is based on an electrochemical detection of the molecular hydrogen passing through the membrane. For that purpose, the UEA is purged with hydrogen at the anode side and with air at the cathode side. Using the protocol, the UEA is brought to equilibrium state by holding current density steady at 0.4 A/cm2, flowing hydrogen to the anode at a 1.5 stoichiometry, flowing air to the cathode at a 4.0 stoichiometry, 134 kPa(abs) outlet pressure, and an operating temperature of 70° C. for 15 minutes. After 15 minutes of equilibration, the current density is dropped to 0 A/cm2 (OCV—Open Cell Voltage) with gases still on and held for 3 minutes. After the 3 minutes, the air to the cathode side is turned off and the cell voltage is recorded as a function of time. The cell voltage will decrease as a function of hydrogen permeation, which is an indication of degradation of the membrane. In particular, the time it takes the cell to drop to 100 mV is obtained from the data and used for comparing individual cells to others as well as observing the long term durability of the membrane. A value of less than 20 seconds is generally considered the failure limit. As shown below in Table 1, the run time was measured for each UEA to drop to 100 mVolts after hours of operation. After over 2,000 hours of operation, the four UEAs had little (less than about a 20%) decrease in time to 100 mV, and show that the UEAs were durable for over 2100 hours.

TABLE 1

| Stack Run Time (hours) | Time to 100 mV (seconds) | | | |
|---|---|---|---|---|
| | A | B | C | D |
| 109.6 | 62 | 60 | 61 | 61 |
| 219.4 | 62 | 61 | 61 | 61 |
| 459.0 | 61 | 61 | 61 | 61 |
| 661.8 | 62 | 61 | 62 | 61 |
| 967.4 | 61 | 59 | 61 | 59 |
| 1168.9 | 61 | 61 | 61 | 61 |
| 1420.7 | 61 | 62 | 62 | 62 |
| 1647.1 | 60 | 60 | 61 | 61 |
| 1859.5 | 59 | 58 | 59 | 59 |
| 2107.9 | 54 | 54 | 56 | 54 |

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method for simultaneous application of multiple fuel cell component coatings on a substrate, the method comprising:
   providing a substrate; and
   simultaneously coating two or more separate solutions onto the substrate under laminar flow such that a non-porous layer solution is simultaneously coated on a first porous layer solution such that a separate layer structure is preserved between the first porous layer solution and the non-porous layer solution;
   wherein the first porous layer solution comprises an electrode ink and the non-porous layer solution comprises a membrane solution.

2. The method of claim 1, wherein the method further comprises applying a porous reinforcement layer on the non-porous layer solution.

3. The method of claim 1, wherein the method further comprises drying the first porous layer solution and the non-porous layer solution to form a first porous layer and a non-porous layer.

4. The method of claim 2, wherein the method further comprises drying the first porous layer solution, the non-porous layer solution, and the porous reinforcement layer to form a first porous layer on the substrate, a non-porous layer on the first porous layer, and the porous reinforcement layer on the non-porous layer.

5. The method of claim 1, wherein the two or more solutions are simultaneously coated using a slot die coating process, a slide coating process, a curtain coating process, a roll coating process, or combinations thereof.

6. The method of claim 1, wherein the substrate is gas diffusion media.

7. The method of claim 1, wherein the electrode ink comprises one or more solvents, an ionomer, and a catalyst.

8. The method of claim 1, wherein the membrane solution comprises one or more solvents and an ionomer.

9. The method of claim 1, wherein the laminar flow has a Reynolds number of less than about 50.

10. A method for simultaneous application of multiple fuel cell component coatings on a substrate, the method comprising:
    providing a substrate; and
    simultaneously coating three or more separate solutions onto the substrate under laminar flow such that a non-porous layer solution is simultaneously coated on a first porous layer solution such that a separate layer structure is preserved between the first porous layer solution and the non-porous layer solution;
    wherein the first porous layer solution comprises an electrode ink and the non-porous layer solution comprises a membrane solution.

11. The method of claim 10, wherein the first porous layer solution is simultaneously coated on a microporous layer solution, and the microporous layer is simultaneously coated on the substrate.

12. The method of claim 10, wherein the microporous layer solution comprises:
    a. a solvent comprising an organic solvent, water or mixtures thereof;
    b. carbon particles; and
    c. a hydrophobic polymer comprising polytetrafluoroethylene, polyvinylidene fluoride, fluoroethylene propylene, or combinations thereof.

13. The method of claim 11, wherein the method further comprises drying the microporous layer solution, the first porous layer solution and the non-porous layer solution to form a microporous layer, a first porous layer and a non-porous layer.

14. The method of claim 10, wherein a second porous layer solution is simultaneously coated on the non-porous layer solution, and wherein the second porous layer solution comprises an electrode ink.

15. The method of claim 14, wherein the method further comprises drying the first porous layer solution, the non-porous layer solution, and the second porous layer solution to form a first porous layer, a non-porous layer, and a second porous layer.

16. The method of claim 10, wherein the substrate is gas diffusion media.

17. The method of claim 10, wherein the laminar flow has a Reynolds number of less than about 50.

18. A method of making a membrane electrode assembly, the method comprising:
    simultaneously coating two or more separate solutions onto a first substrate to form a cathode substrate, wherein the coating is performed under laminar flow such that a membrane solution is simultaneously coated on a cathode solution such that a separate layer structure is preserved between the membrane solution and the cathode solution;
    simultaneously coating two or more separate solutions onto a second substrate to form an anode substrate, wherein the coating is performed under laminar flow such that the membrane solution or another membrane solution is simultaneously coated on an anode solution such that a separate layer structure is preserved between the respective membrane solution and the anode solution; and
    hot pressing the cathode substrate to the anode substrate such that a layer formed by the cathode solution and a layer formed by the anode solution, after removal of solvents, are on opposite sides of at least one layer formed by the membrane solutions.

19. The method of claim 18, wherein the method further comprises drying the cathode substrate and the anode substrate.

20. The method of claim 18, wherein the laminar flow has a Reynolds number of less than about 50.

\* \* \* \* \*